Figure 1:
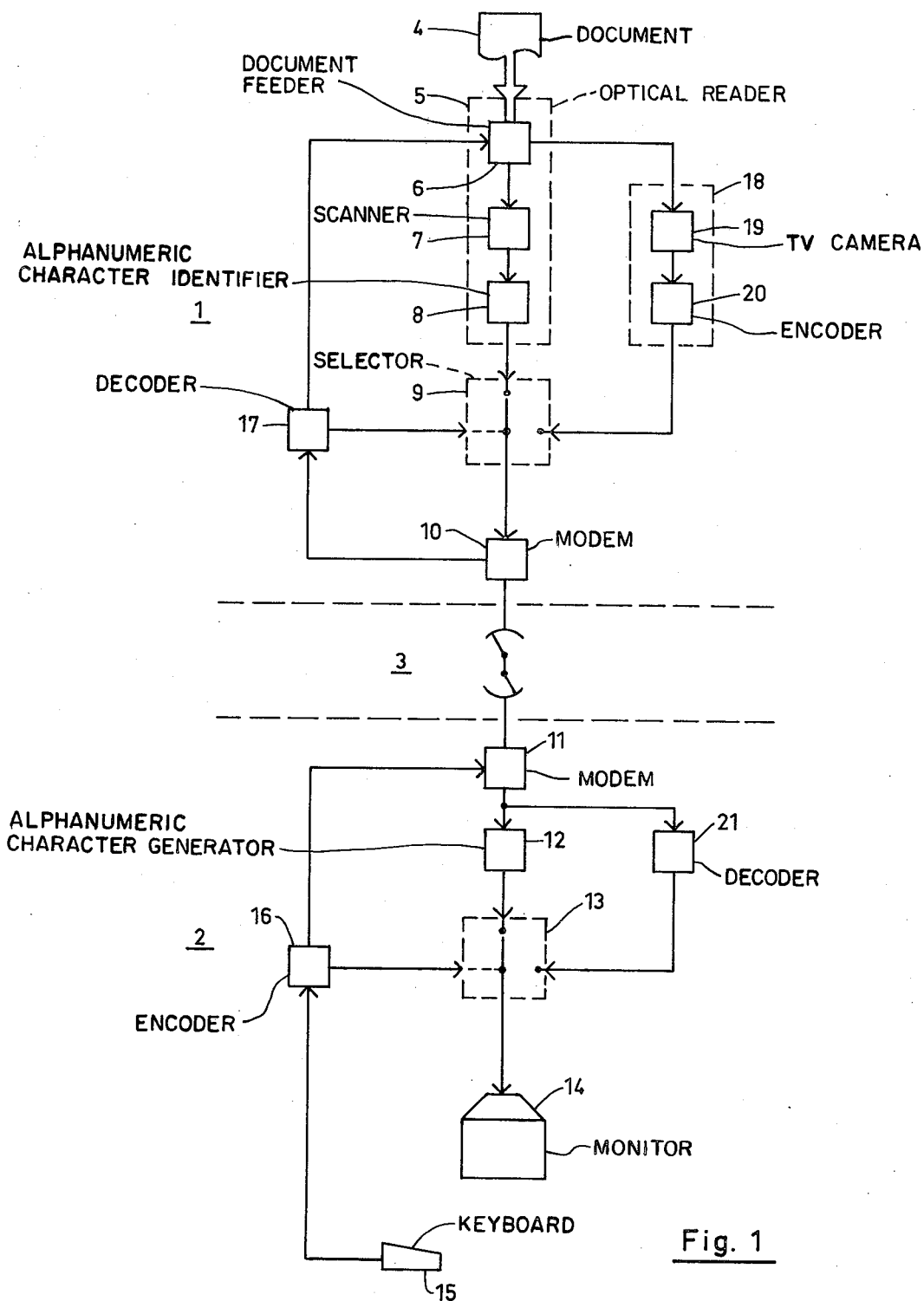

United States Patent [19]
Wern et al.

[11] 3,995,106
[45] Nov. 30, 1976

[54] INFORMATION TRANSMISSION SYSTEM

[76] Inventors: Carl Rune Wern; George Herman Wern, both of Vartavagen 59, 115 38 Stockholm, Sweden

[22] Filed: May 9, 1974

[21] Appl. No.: 468,381

[30] Foreign Application Priority Data
May 15, 1973 Sweden.............................. 7306857

[52] U.S. Cl............................... 178/6.8; 178/4.1 R; 340/146.3 R; 340/324 AD
[51] Int. Cl.²........................................... H04N 7/18
[58] Field of Search.................... 178/6, 6.8, DIG. 3; 179/2 DP; 340/146.3 H

[56] References Cited
UNITED STATES PATENTS

| | | | |
|---|---|---|---|
| 3,200,194 | 8/1965 | Rabinow | 340/146.3 H |
| 3,536,840 | 10/1970 | Sullivan | 179/2 DP |
| 3,539,715 | 11/1970 | Lemelson | 178/6 |
| 3,549,809 | 12/1970 | Stehr | 179/2 DP |
| 3,611,267 | 10/1971 | Edling | 178/6 |
| 3,641,555 | 2/1972 | Griffin | 179/2 DP |
| 3,686,631 | 8/1972 | Elliot | 179/DIG. 3 |
| 3,806,871 | 4/1974 | Shepard | 340/146.3 H |

*Primary Examiner*—Howard W. Britton
*Attorney, Agent, or Firm*—Strauch, Nolan, Neale, Nies & Kurz

[57] ABSTRACT

The invention refers to a system for rapidly transferring optical information from a document to a human being over a telecommunication channel. The system comprises an optical reader connected over the telecommunication channel to a visual display terminal which is provided with an alphanumeric character generator and from which the speed of reading at the optical reader is remotely controlled.

1 Claim, 4 Drawing Figures

INFORMATION TRANSMISSION SYSTEM

The invention refers to a system for rapidly transferring optical information from a document to a human being over a telecommunication channel.

To transfer optical information over a conventional telephone channel requires a transfer time of the order of one minute for all the facsimile and picture telephone systems heretofore put into practice. This fact postpones the use of these systems in public and private libraries until the establishment of large scale communication networks of video channels. A video channel has a bandwidth that corresponds to 300 – 1000 conventional telephone channels and is choiced on the basis of minimum requirements on legibility of transferred text data.

A main object of the invention is to provide a system for rapidly transferring optical information from a document in a library to a human being at a remote visual display over a telecommunication channel.

The system of the invention enables, as compared with all the known systems devised for the same object, a more rapid transfer of optical information from the document in the library to the human being at the remote visual display by being capable of providing a better legibility of transferred text data so that the speed of reading is increased.

The system of the invention enables the rapid transfer of optical information from the document in the library to the human being at the remote visual display even over a conventional telephone channel.

Figure 2:
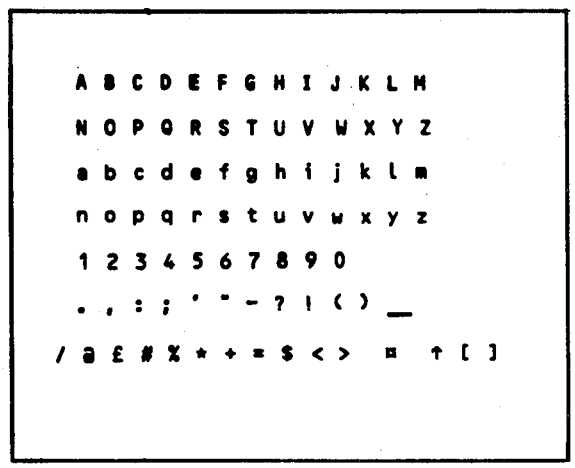
Figure 3:
Figure 4:

The invention, the characteristic features of which are stated in the appended claims, will now be described in detail with reference made to the accompanying drawing where FIG. 1 shows an embodiment of the system of the invention for rapidly transferring optical information from a library to a remote visual display over a conventional telephone channel, FIG. 2 shows an example of a font that is suitable for text data in the library in FIG. 1, and FIGS. 3 and 4 show examples of pictorial data which can be transferred from the library to the remote visual display in FIG. 1 at a transfer time of less than 1 second and equal to about 3 seconds respectively.

FIG. 1 shows an embodiment of the system of the invention for rapidly transferring optical information from a library 1 to a visual display terminal 2 over a conventional telephone channel 3. The library 2 comprises a document 4 arranged to be read by an optical reader 5 that is of a known construction and, according to the example, consists of a document feeder 6, a scanner 7, and an alphanumeric character identifier 8. The latter has an output on which code words are generated in correspondence to identified alphanumeric characters on the document 4. The code words are fed over a selector 9 to a signal input of a modem 10 that is connected to the telephone channel 3 and transfers the code words over this to the visual display terminal 2.

The visual display terminal 2 comprises a modem 11 that is connected to the telephone channel 3 and has a signal output on which the code words transferred from the modem 10 in the library 1 are regenerated. The regenerated code words are fed to an alphanumeric character generator 12 that is of a known construction and has an output on which a video signal is supplied in correspondence to the code words. The video signal is fed over a selector 13 to a video signal input of a TV-monitor 14 that according to the example is provided with a picture memory consisting of a dynamic MOS register. The TV monitor 14 has a picture screen on which the text data of the document 4 in the library 1 can be reproduced in an optional font determined by the actual construction of the alphanumeric character generator 12. According to the example, the alphanumeric characters are formed in a 5 by 7 matrice by means of the ASCII Code and are written on the picture screen in 25 lines with 40 characters each in a manner known per se.

The visual display terminal 2 comprises further a keyboard 15 that is connected over an encoder 16 to a signal input of the modem 11 and transfers to this a control signal that is transferred to the library 1 over the telephone channel 3. The control signal is there received by the modem 10 and is regenerated on a signal output of this to be fed over a decoder 17 to an electrical control input of the document feeder 6 that in this way becomes remotely controlled from the keyboard 15. It is possible, thanks to the remote control of the document feeder 6, to read the text data of the document 4 on the picture screen of the TV-monitor 14 at an optional speed and to have it repeatedly scanned by the scanner 7 whereby the importance of errors in the translation and transmission is reduced. From this it should be understood by the man skilled in the art that the minimum requirements on the performance of the optical reader 5 as regards the speed of reading and the translation error intensity are considerably lower for the system in FIG. 1 than for conventional optical reader systems in which text data are translated to code words that are processed mechanically without requiring the assistance of a human being.

The library is provided with a picture transmitter 18 comprising a TV-camera 19 that has a video output connected to an encoder 20 the function of which is explained below. The earlier mentioned selector 9 has an electrical control input connected to an output of the decoder 17 to temporarily disconnect the alphanumeric character identifier 8 of the optical reader 5 and instead connect the video output of the TV camera 19 over the encoder 20 to the signal input of the modem 10 under control of the control signal from the keyboard 15 at the visual display terminal 2.

The visual display terminal 2 includes a decoder 21 the function of which is explained below. This decoder 21 has an input connected to the signal output of the modem 11. The earlier mentioned selector 13 has an electrical control input connected to an output of the encoder 16 to temporarily disconnect the alphanumeric character generator 12 and instead connect the signal output of the modem 11 over the decoder 21 to the video input of the TV monitor 14 simultaneously with a corresponding setting of the selector 9 in the library 1 under control of the control signal from the keyboard 15. The settings of the selectors 9 and 13 implie a transfer of pictorial data as an important complementary information to the transfer of text data and make it possible to read the latter in their original version.

FIG. 2 shows an example on a font that is called OCR-B and is suitable for the text data on the document 4. FIGS. 3 and 4 show examples on pictorial data which can as complementary information to text data be transferred from the library 2 to the visual display terminal 2 over the conventional telephone channel 3 at a transfer time of less than 1 second and equal to about 3 seconds, respectively. The encoder 20 and the decoder 21 are then assumed to work in such a way that they start to transfer pictorial data in the form of a limited number of square elements which are divided into square subelements which in their turn are divided into square subelements and so on, as it is described more in detail in the United States patent application Ser. No. 440,737 filed on Feb. 8, 1974 by the applicants herein, and the modems 10 and 11 are assumed to have a speed of transfer of 4800 bits per second.

The described system for rapidly transferring optical information can be modified in many ways within the scope of the appended claims. For example, the library 1 can in a known manner be equipped for mechanical document retriveal to be remotely controlled from the visual display terminal 2 and the latter can be assigned a time shared connection to the library 1. The described system can be applied for rapidly transferring personal data from eventually microfilmed documents in a central library to a post office, a social security office, a bank office, a police station, etc. over the telephone network.

We claim:

1. An information transmission system capable of transferring text data from a remote document to an individual over a regular telephone channel at the individual's own rate of reading, comprising, at a transmitter terminal, an optical reader having a document feeder provided with a control input and arranged for a text line by text line controllable advancement of the document and an alphanumeric character identifier provided with an output for supplying for each text line of the document a set of code words representative of individual alphanumeric characters identified on that text line and a first modem connected to the telephone channel and having a signal output connected to the control input of the document feeder to provide said text line by text line controllable advancement of the document by means of a control signal received over the telephone channel and a signal input connected to the output of the alphanumeric character identifier to transmit the code words on the telephone channel, and, at a receiver terminal, a second modem connected to the telephone channel and having a signal input adapted to be fed with the control signal to transmit it on the telephone channel and a signal output arranged to regenerate the code words transmitted on a telephone channel and an alphanumeric display unit having an input connected to the signal output of the second modem to be fed with the code words, a screen arranged to display a number of text lines of alphanumeric characters corresponding to the original alphanumeric characters on the document at the transmitter terminal and a control means arranged for generating said control signal manually in a text line by text line response by the individual to the alphanumeric characters displayed and having an output connected to the signal input of the second modem to supply the control signal to the signal input of the second modem.

* * * * *